United States Patent
Ekhaus

(10) Patent No.: US 11,287,520 B1
(45) Date of Patent: Mar. 29, 2022

(54) EXTENDED BANDWIDTH TRACKING FOR DYNAMIC ENVIRONMENTS

(71) Applicant: BAE SYSTEMS Information and Electronic Systems Integration Inc., Nashua, NH (US)

(72) Inventor: Ira B. Ekhaus, Arlington, MA (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 254 days.

(21) Appl. No.: 16/674,029

(22) Filed: Nov. 5, 2019

(51) Int. Cl.
*G01S 13/00* (2006.01)
*G01S 13/42* (2006.01)
*G01S 13/58* (2006.01)

(52) U.S. Cl.
CPC ............ *G01S 13/003* (2013.01); *G01S 13/42* (2013.01); *G01S 13/582* (2013.01)

(58) Field of Classification Search
CPC ...... G01S 13/42; G01S 13/931; G01S 13/003; G01S 7/352; G01S 13/34; G01S 13/584; G01S 13/04; G01S 13/32; G01S 13/582; G01S 13/58
See application file for complete search history.

(56) References Cited

U.S. PATENT DOCUMENTS

| | | | |
|---|---|---|---|
| 5,252,980 A | 10/1993 | Gray et al. | |
| 6,750,809 B1 * | 6/2004 | Cho | G01S 13/90 342/129 |
| 6,965,341 B1 * | 11/2005 | Cho | G01S 13/24 342/25 A |
| 8,120,526 B2 | 2/2012 | Holder | |
| 8,854,252 B2 | 10/2014 | Holder | |
| 9,401,741 B2 | 7/2016 | Holder et al. | |
| 9,696,418 B2 | 7/2017 | Holder | |
| 2012/0280851 A1 | 11/2012 | French | |
| 2013/0241764 A1 | 9/2013 | Kozma et al. | |
| 2017/0285158 A1 | 10/2017 | Halbert et al. | |
| 2017/0314892 A1 | 11/2017 | Holder | |
| 2020/0049810 A1 * | 2/2020 | Longman | G01S 13/282 |
| 2020/0301002 A1 * | 9/2020 | Wu | G01S 13/4409 |

FOREIGN PATENT DOCUMENTS

WO 2007/016098 A2 2/2007

OTHER PUBLICATIONS

International Search Report, PCT/US20/57495, dated Feb. 4, 2021, 7 pages.

(Continued)

*Primary Examiner* — Olumide Ajibade Akonai
(74) *Attorney, Agent, or Firm* — KPIP Law, PLLC; Gary McFaline

(57) ABSTRACT

A system and method for using coherent aggregated bandwidth over multiple transmissions for improved performance of precision guidance and positioning and of object tracking systems. Angular offset (Az/El) estimations are strongly impacted by interference between direct and (comparable amplitude) ground-reflected signals. In rough ground situations, there could be many ground reflected signals. Bandwidth aggregation as used herein achieves sharper range sidelobes and smaller magnitude multipath interference terms resulting in increasingly accurate interferometric results.

20 Claims, 10 Drawing Sheets

(56) References Cited

OTHER PUBLICATIONS

M. Mallick et al., "Angle-only filtering in 3D using Modified Spherical and Log Spherical Coordinates", 14th International conference on Information Fusion, Chicago, Illinois; pp. 1905-1912, Jul. 5-8, 2011.
K. Radhakrishnan et al., "Bearing only Tracking of Maneuvering Targets using a Single Coordinated Turn Model", International Journal of Computer Applications (0975-8887) vol. 1—No. 1, pp. 25-33; 2010.
"Heterodyne", https://en.wikipedia.org/wiki/Heterodyne, known of at least since Apr. 24, 2019.
"Interferometry", https:/en.wikipedia.org/wiki/Interferometry, known of at least since Apr. 24, 2019.
"Monopulse radar", https://en.wikipedia.org/wiki/Monopulse radar, known of at least since Apr. 24, 2019.
"Pulse-Doppler signal processing", https://en.wikipedia.org/wiki/Pulse-Doppler_signal_processing, known of at least since Apr. 24, 2019.
"Undersampling", https://en.wikipedia.org/wiki/Undersampling, known of at least since Apr. 24, 2019.
Armin W. Doerry, "SAR Processing with Stepped Chirps and Phased Array Antennas", Sandia Report, Sandia National Laboratories, Printed Sep. 2006, Albuquerque, NM.

\* cited by examiner

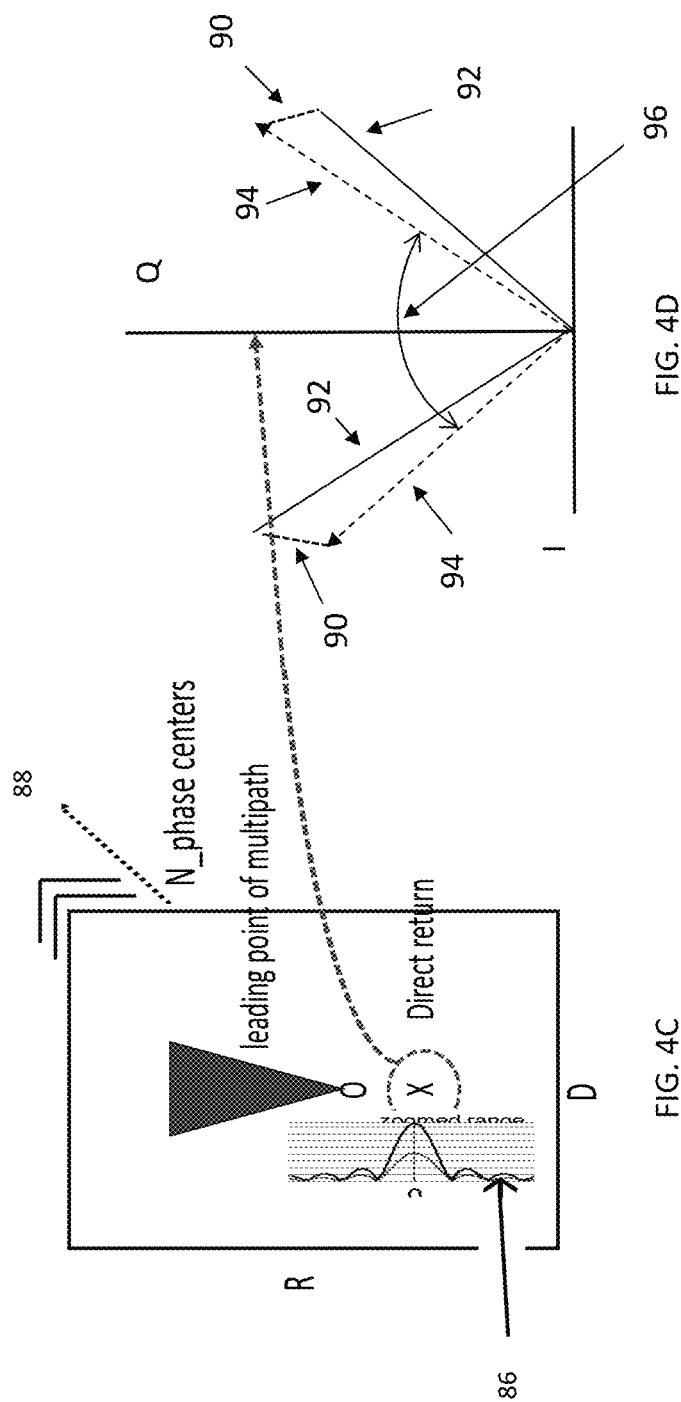

EXTENDED BANDWIDTH TRACKING FOR DYNAMIC ENVIRONMENTS

FIELD OF THE DISCLOSURE

The present disclosure relates to signal processing and more particularly to the remediation of multipath bias effects using interferometry in guidance and positioning and object tracking applications.

BACKGROUND OF THE DISCLOSURE

Guidance and positioning systems, or more generally guidance, navigation and control (GN&C) systems are used in commercial and military applications. Guidance is the process of calculating changes in a moving object's position, velocity, attitude, and/or rotation rates. This information is used for guiding an object along a certain trajectory and/or attitude profile and success is based on accurate information about the object's state of motion. Similarly, object (e.g., target) tracking applications calculate changes in position, velocity, attitude, and/or rotation rates of a moving object.

Typically, relative azimuth and elevation positional offsets of an object, or target, are determined by a Fire Control Radar (FCR) system that implements a beam split (monopulse) amplitude comparison or a phase difference comparison via radio frequency interferometric (RFI) processing to track the moving object. Recent developments in radio frequency interferometric processing have provided for improved tracking and positioning systems using radio frequency orthogonal interferometry (RF/OI) (e.g., by using a radio frequency (RF) receiver on a moving object). It should be noted that in this particular conventional RF/OI application, a means to achieve waveform orthogonality is done on the FCR transmissions.

In an RF/OI system, coherence is needed between a transmitter and a receiver. In some cases, these systems utilize a phase tracking loop/block/module. In certain cases, synchronization is required for extended time integration. Systems with transmitted signals sent via multiple transmitters also require strict coherence between the multitudes of signals. Maintaining strict coherence between these transmitted signals sent via multiple transmitters becomes even more difficult at low grazing angles where low altitude and long range propagation geometries develop indirect multipaths. In a two-way case, however, where range Doppler (RD) map generation is used for object tracking, the transmitter/receiver (Tx/Rx) synchronization challenge is not present.

In both one and two way cases, these multipath contributions are, with decreasing receiver altitude, increasingly close to the direct path in time of arrival at the receiver and this effect biases the resulting angle estimation.

Wherefore it is an object of the present disclosure to overcome the above-mentioned shortcomings and drawbacks associated with conventional signal processing for RD map generation as it relates to guidance and positioning and to object tracking systems in multipath or cluttered environments.

SUMMARY OF THE DISCLOSURE

One aspect of the present disclosure is a method for precision guidance and positioning or tracking of an object, comprising: transmitting, from one or more spatially displaced antenna elements, a sequence of transmitted pulses with a center frequency that varies per pulse; receiving the sequence of transmitted pulses at one or more receiving antenna elements; processing over a plurality of received signals, comprising: forming a complex valued range/Doppler map developed by correlating a received signal with a transmitted signal by matched filtering against a respective transmit key; coherently summing the sequence of center frequency varied pulses over the plurality of received pulses; applying a correction term representing a conjugate of a phase shift due to a frequency shift and a radial motion phase shift effect, thus achieving an increased effective bandwidth; and performing radar post processing and interferometric post processing to produce precision guidance and positioning or tracking data for an object, the data having an increased effective range resolution with reduced vulnerability to multipath bias effects.

One embodiment of the method is wherein the object is a passive target or an object comprising an RF receiver.

Another embodiment of the method is wherein radar post processing comprises: performing pulse compression and decoding; forming a range/Doppler map for each phase center; identifying one or more detections in each range/Doppler map, wherein the detections are associated with a particular transmit/receive pair; removing ambiguities in range and Doppler in each range/Doppler map; and co-registering one or more detections across a plurality of range/Doppler maps.

Yet another embodiment of the method is wherein interferometric post processing comprises: performing phase comparisons for each co-registered detection; and performing angle estimation of the position of the one or more objects.

Still yet another embodiment of the method is wherein matched filtering comprises two or more spatially disjoint receptions matched filtered against a single transmission. In some cases, matched filtering comprises a spatially coincident reception that is decomposed into two or more distinct signals by matched filtering against two or more distinct transmissions.

In certain embodiments, transmitting comprises a bandwidth step index that is proportional to a pulse index.

Another aspect of the present disclosure is a method for precision guidance and positioning or tracking of an object, comprising: receiving a sequence of one or more transmitted pulses at one or more receiving antenna elements; processing over a plurality of received signals, comprising: forming a complex valued range/Doppler map developed by correlating a received signal with a transmitted signal by matched filtering against a respective transmit key; coherently summing the sequence of center frequency varied pulses over the plurality of received pulses; applying a correction term representing a conjugate of a phase shift due to a frequency shift and a radial motion phase shift effect, thus achieving an increased effective bandwidth; and performing radar post processing and interferometric post processing to produce precision guidance and positioning or tracking data for an object, the data having an increased effective range resolution with reduced vulnerability to multipath bias effects.

One embodiment of the method is wherein the object is a passive target or an object comprising an RF receiver.

Another embodiment of the method is wherein the one or more transmitted pulses comprise a bandwidth step index that is proportional to a pulse index.

In certain embodiments, radar post processing comprises: performing pulse compression and decoding; forming a range/Doppler map for each phase center; identifying one or more detections in each range/Doppler map, wherein the detections are associated with a particular transmit/receive pair; removing ambiguities in range and Doppler in each range/Doppler map; and co-registering one or more detections across a plurality of range/Doppler maps.

In certain embodiments, interferometric post processing comprises: performing phase comparisons for each co-registered detection; and performing angle estimation of the position of the one or more objects.

Yet another embodiment of the method is wherein matched filtering comprises two or more spatially disjoint receptions matched filtered against a single transmission. In some cases, matched filtering comprises a spatially coincident reception that is decomposed into two or more distinct signals by matched filtering against two or more distinct transmissions.

Yet another aspect of the present disclosure is a computer program product including one or more machine-readable mediums encoded with instructions that when executed by one or more processors cause a process to be carried out for guidance, positioning, or tracking of an object, the process comprising: forming a complex valued range/Doppler map developed by correlating a received signal with a transmitted signal by matched filtering against a respective transmit key; coherently summing a sequence of center frequency varied pulses over a plurality of received pulses; applying a correction term representing a conjugate of a phase shift due to a frequency shift and a radial motion phase shift effect, thus achieving an increased effective bandwidth; and performing radar post processing and interferometric post processing to produce precision guidance and positioning or tracking data for an object, the data having an increased effective range resolution with reduced vulnerability to multipath bias effects.

One embodiment of the computer program product is wherein the object is a passive target or an object comprising an RF receiver.

Another embodiment of the computer program product is wherein radar post processing comprises: performing pulse compression and decoding; forming a range/Doppler map for each phase center; identifying one or more detections in each range/Doppler map, wherein the detections are associated with a particular transmit/receive pair; removing ambiguities in range and Doppler in each range/Doppler map; and co-registering one or more detections across a plurality of range/Doppler maps.

Yet another embodiment of the computer program product according to claim 15, wherein interferometric post processing comprises: performing phase comparisons for each co-registered detection; and performing angle estimation of the position of the one or more objects.

In some cases, matched filtering comprises two or more spatially disjoint receptions matched filtered against a single transmission. In certain embodiments, matched filtering comprises a spatially coincident reception that is decomposed into two or more distinct signals by matched filtering against two or more distinct transmissions.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

FIG. 4C depicts representative autocorrelation properties of the presently disclosed processing scheme over a range of bandwidth stacking parameters.

FIG. 4D depicts an exemplary phasor diagram representation of the multipath components for an exemplary range of bandwidth stacking parameters and the respective differential phase precision for interferometric angle estimation according to the principles of the present disclosure.

DETAILED DESCRIPTION OF THE DISCLOSURE

Figure 1A:
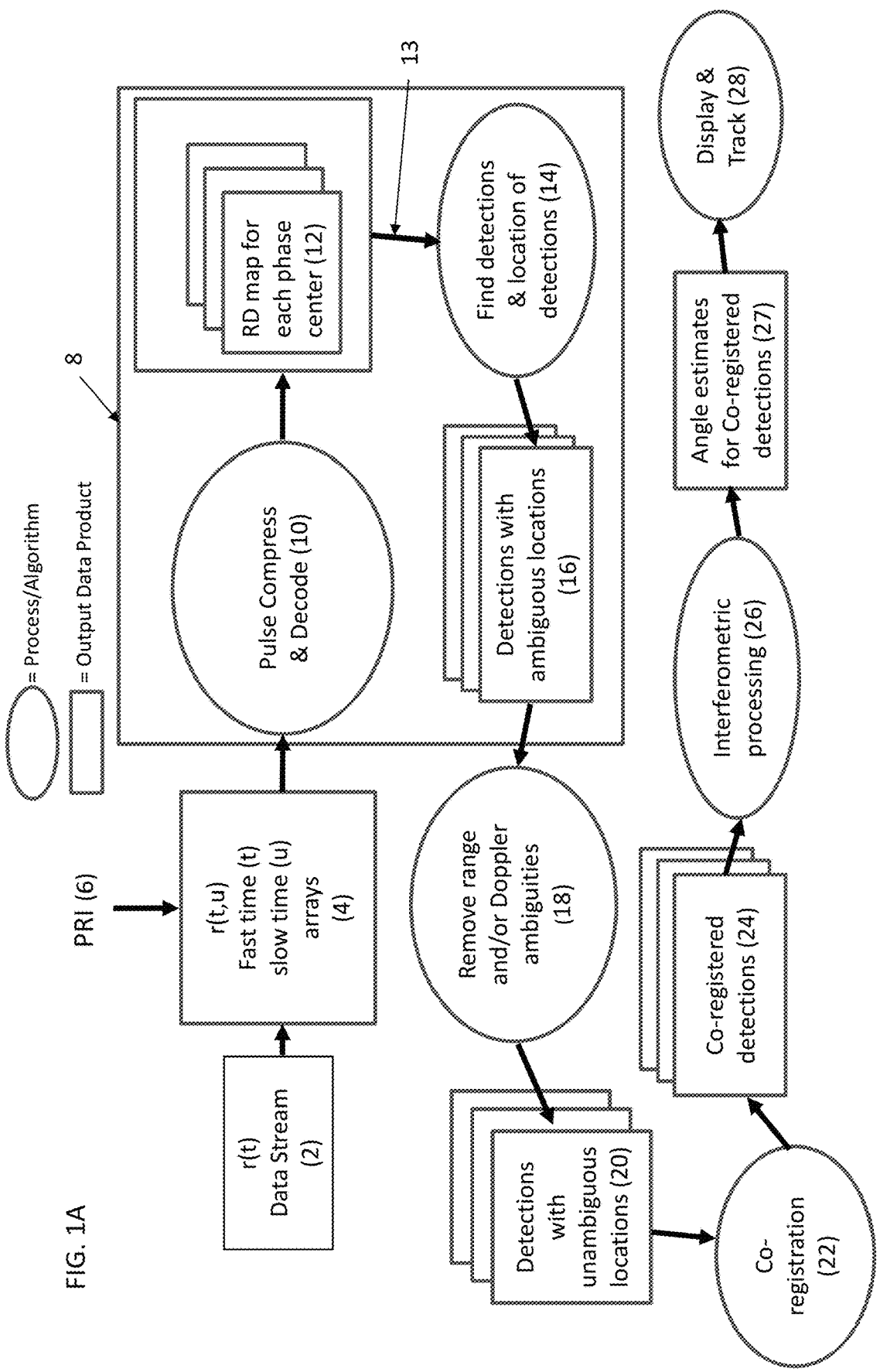
FIG. 1A is a diagram of one embodiment of a radar processing chain according to the principles of the present disclosure.

The present disclosure discusses a major benefit of this system from the broader perspective of the ability to develop precise radio frequency (RF) positioning based on a moving object (e.g. a target or a receiver) at low grazing angles; this capability would otherwise be limited by multipath interference that degrades the validity of the interferometric processing results (e.g., Az/El angular offset estimates). One embodiment of the present disclosure is used in object (e.g. target) tracking. Another embodiment of the present disclosure is used in guidance and positioning. The system and method can also be applied to guidance and positioning of assets in applications such as low flying anti-cruise missile systems or in UAV guidance.

Certain embodiments of this disclosure are used in object tracking using conventional interferometry (CI) processing (i.e., a two-way case). In other embodiments, the object comprises an RF receiver for use in orthogonal interferometry (OI) processing (i.e., a one-way case). OI is a variant of CI that exploits the orthogonality of waveforms to allow for the reception of multiple signals with their phases shifted according to their respective geometric path lengths. The multiple signals are received by a single point receiver and decoded. In such cases, the path length differences are related to the transmitters' interferometric baseline (the distance between transmitters), and the position of the receiver relative to the interferometric baseline, while the sum of these multiple transmissions is received at a single receiver, and the interferometrically developed phase difference is based on the single channel reception as processed on the receiver.

The present disclosure relates to the application of coherent aggregated bandwidth over multiple transmissions for improved performance of precision guidance and positioning and object tracking systems. One application of the present disclosure involves improved FCR position estimates for objects (e.g., in a two-way case) and guidance and positioning of objects having an RF receiver (e.g., in a one-way case) in multipath or cluttered environments where increased range resolution can reduce bias effects that would otherwise adversely impact the accuracy of interferometric position estimates (e.g., Az/El angular offsets).

As will be described herein, the present disclosure addresses the mitigation of bias effects of RF multipath that impinge on interferometric processing. For guidance applications involving objects with RF enabled receivers, for example, size, weight, power and other constraints (e.g. robustness against high acceleration launch) place additional limitations on the achievable bandwidth of installed digitization hardware such as analog-digital converters (ADC). This places subsequent limitations on the resolvable range and the ability to discriminate multipath in these cases.

The present disclosure develops a method for improved implementation techniques for high range resolution range Doppler (RD) maps and their application towards interferometry. It is understood by those of ordinary skill in the art that an RD map is a standard, intermediate (and sometimes final) data product of a radar processing chain. See, e.g., FIG. 1A.

Referring to FIG. 1A, a diagram of one embodiment of a radar processing chain according to the principles of the present disclosure is shown. In a typical radar front end, RF signals from an antenna are typically processed using low noise amplifiers, filters, down-conversion stages (mixers) and analog-digital converters to convert the RF input signals to I and Q data signals. A data stream of received signals 2 of I and Q data is output as a complex 1-D vector. The transmit time and receive time are synchronized and the receiver data stream output is reshaped into a 2-D array of fast (t) and slow (u) time 4 by dividing the receiver output by the pulse repetition interval (PRI) 6 and aligning a plurality of pulses by the start of the pulse and the end of the pulse.

Post-processing 8 includes several steps such as pulse compression and decoding 10, where decoding includes de-interleaving signals (for the orthogonal case) from different phase centers and providing a plurality of phase centers. The data is divided into coherent processing intervals (CPI) where the size of the CPI (over a set of slow time pulses u) depends on the processing parameters. A longer CPI will provide better SNR, as there is more data to coherently process. Each CPI is used to calculate a range Doppler (RD) map for each phase center 12. As further described in the Additional Algorithm Support section, respective RD maps are calculated for each phase center for the interferometric processing step. The RD maps are used as the primary input data format 13 for object detection and the locations of each of those object detections 14 are particular pairs of range and Doppler values often referred to as pixels within an RD map. The detections are based on thresholding and detection methodologies familiar to one versed in radar system design, where the detections (based on the intensity in both range and Doppler space) have possible locations with some remaining ambiguity 16 in both range and Doppler space.

The range and Doppler space ambiguities are removed 18 via probabilistic updates over several CPI periods and the resultant unambiguous object detections and their respective locations 20 are then produced. Following the production of the resultant unambiguous object detections and their respective locations at 20, a co-registration step 22 produces co-registered detections 24 across the multiple RD maps. In the embodiment shown in the figure, the co-registered detections 24 are used in interferometric processing 26 to produce angle (Az/El) offset estimates 27 for each of the co-registered detections. In some embodiments, additional ambiguities may have been incurred due to a large interferometric baseline, for example. Thus, following an interferometric processing step 26, these angular ambiguities may be removed as part of an angle estimation procedure 27 for the co-registered detection. This data is then displayed and used for tracking and/or guidance 28.

More specifically, RD maps are a generalization of the one dimensional parameter matched filter estimator of range delay ($\tau=[1,2]$ *Range/C)) extended to include a second parameter of a (radial) velocity induced Doppler frequency shift parameter, $f_d=2\ v_{radial}/\lambda$—resulting in a two dimensional matched filter estimator ($\tau$, $f_d$). The [1,2] notation denotes either a 2-way case (FCR position estimates of an object) or a 1-way case (FCR illuminating an RF receiver on an object).

The likelihood function of a signal's return as a function of time delay, $\tau$, and Doppler shift, $\omega_d$, is expressed as $\Lambda(\tau, \omega_d)=\int r(t)s_o(t-\tau)\ EJ(\omega_d\ t)\ dt$ with received signal r(t), and transmitted signal model $s_o(t)$ where the notation $EJ(x)=e^{jx}$. As pulsed radar systems became more and more common, the phrase Range Doppler (RD) map gained preference and RD maps became a common result used for presentation or subsequent processing. In one embodiment of the present disclosure, RD maps are a core post-processing element 12, where there is one RD map formed for each Tx/Rx path (for a one-way case) or each signal sent and reflected off an object (for a two-way case).

It is understood that range Doppler (RD) maps inherently include (to some level) sidelobes in range and Doppler which depends on the waveform design and the system details. Even if an FCR system has the instantaneous bandwidth (IBW) to meet the range resolution requirements for a given application, the receiver (in an OI case) may not have an analog-to-digital converter (ADC) with adequate IBW; for example, projectile environment constraints may limit the available components. Inherent ambiguity and aliasing in both range and Doppler is further defined by the pulse repetition interval (PRI). It is understood that standard pulsed radars build up received signal to noise ratios (SNR) by repeating the signal at a pulse repetition frequency (PRF). A resultant RD map can be developed as a 2-D fast Fourier transform (FFT) where $r(t_{absolute})$ is reformatted into a data matrix comprising a fast-time (t) and a slow-time (u) index, where $t_{absolute}=t+u*PRI$. The span of coherent integration Tan has a commensurate span over slow time $u \subset Nu$. Additional detail is provided in the Additional Algorithm Support section, below.

Figure 1C:
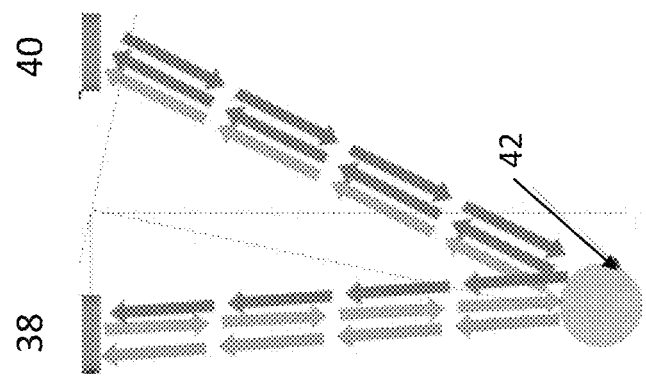
FIG. 1C is a diagram of orthogonal interferometry (OI) in a guidance and positioning application with multiple transmitters and a RF receiver on a moving object (a one way case).
Figure 1B:
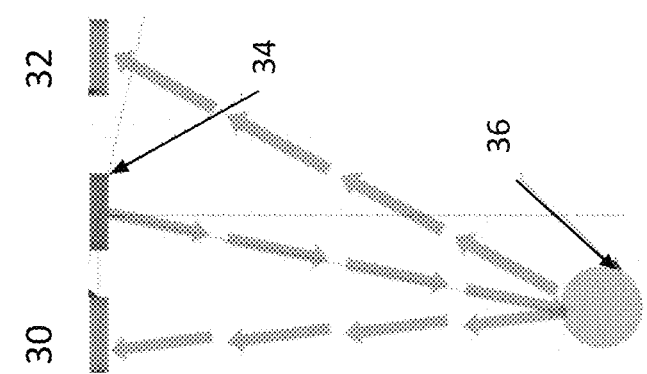
FIG. 1B is a diagram of conventional interferometry (CI) in an object tracking application with a single transmitter and multiple receivers (a two way case).

Relating the interferometric processing step in FIG. 1A to the two configurations depicted in FIG. 1B and FIG. 1C, it is important to note that interferometry is based on a comparison of received phase that is developed by differential path length changes in signals that relate to distinct RD maps. In conventional interferometry (CI) (FIG. 1B) there is a single transmitter 34 and multiple receivers 30, 32. With orthogonal interferometry (OI) (FIG. 1C) there are multiple, orthogonal transmissions 38, 40 and a single receiver 42. As is shown in FIG. 1B, the single transmitter 34 transmits a signal which is reflected back from an object 36 (e.g., a target or an asset) and the signal is detected by two or more receivers 30, 32. As is shown in FIG. 1C, with orthogonal interferometry, a receiver is present on the moving object 42 and that receiver receives signals transmitted by multiple transceivers 38, 40.

In one embodiment of the present disclosure, the interferometric angle (Az/El) estimation subsystem (FIG. 1A 27) for the co-registered detections operates on a detected region (FIG. 1A 24) of the respective (e.g., each Tx/Rx pair) RD maps and is based on the transmitted wavefront reflected by the target as seen by the respective elements of the FCR (See, e.g., FIG. 1B). In another embodiment of the present disclosure, an orthogonal interferometric (OI) angle (Az/El) estimation subsystem operates on another detected region of the respective (e.g., each Tx/Rx pair) RD maps and is based on the transmitted wavefront (from each independent phase center of the OI FCR) detected by a receiver on the object. (See, e.g., FIG. 1C). In this latter case, the detected region relates to the receiver's estimate of the FCR within the RD map referenced to its own position.

Figure 2:
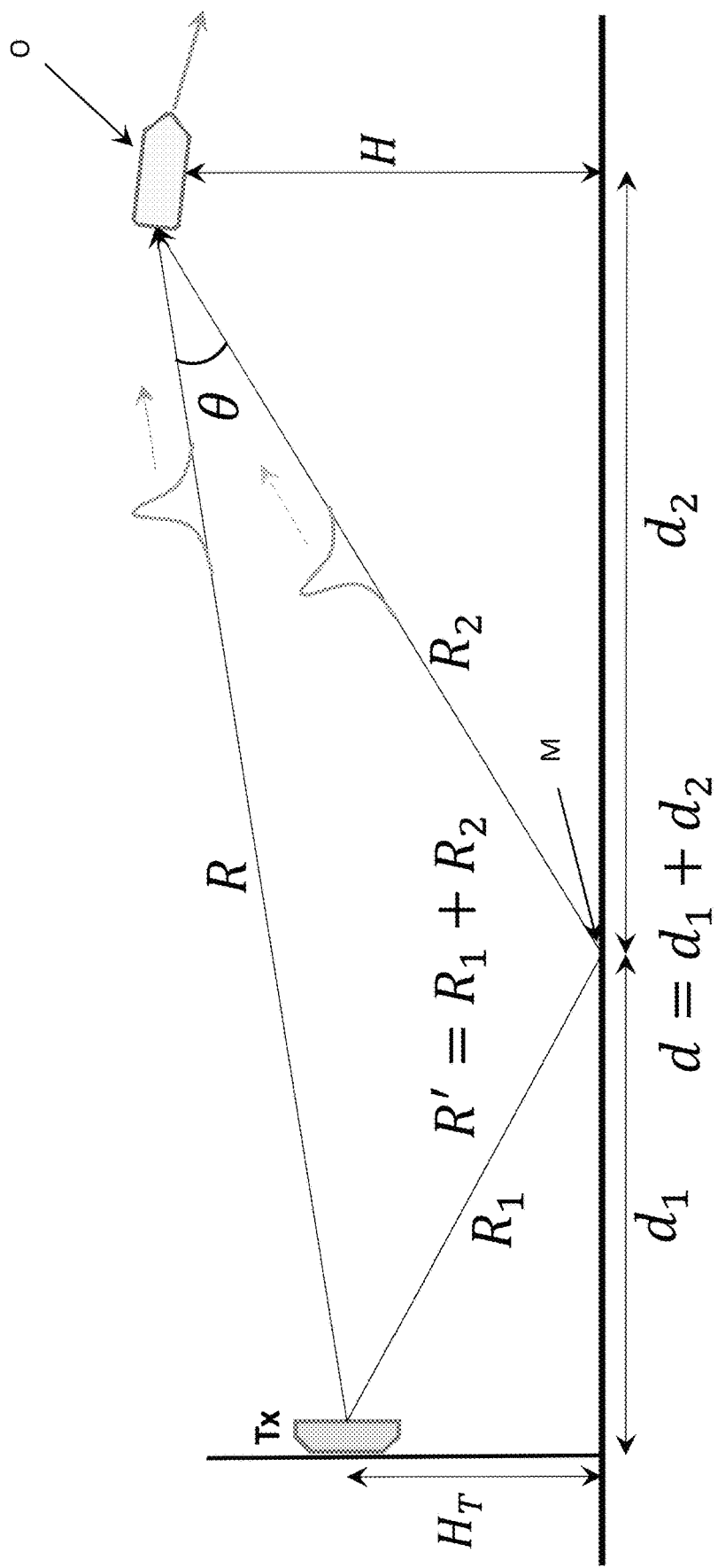
FIG. 2 is a diagram depicting multipath resulting from a low grazing angle geometry in a typical radar application.

Referring to FIG. 2, a diagram depicting multipath resulting from a low grazing angle geometry is shown. More specifically, for grazing incidence ($d_1$, $d_2 \gg H$, $H_T$) the various signals arrive from similar directions ($\sin(\theta) \ll 1$), with similar ranges ($R' \cong R$). The multipath geometry involves a range of terms: ($d_1$, $d_2 \gg H$, $H_T$), where $d_1$ is the horizontal distance from the transmitter to the nominal ground bounce point M, and $d_2$ is the horizontal distance from the object to the nominal ground bounce point M. The object O can either be a passive target or a receiver—both cases will incur unwanted multipath contributions. $H_T$ is the vertical height of the transmitter above the ground, H is the vertical height of the object above the ground, R, $R_1$, $R_2$ are respective slant range distances for the direct path, transmit to bounce point, and bounce point to object O, respectively, and R' is the total multipath distance. For the present application, the time delay between the direct and the first multipath return is typically considered in terms of the system's effective range resolution (see e.g., FIG. 4C).

Figure 3:
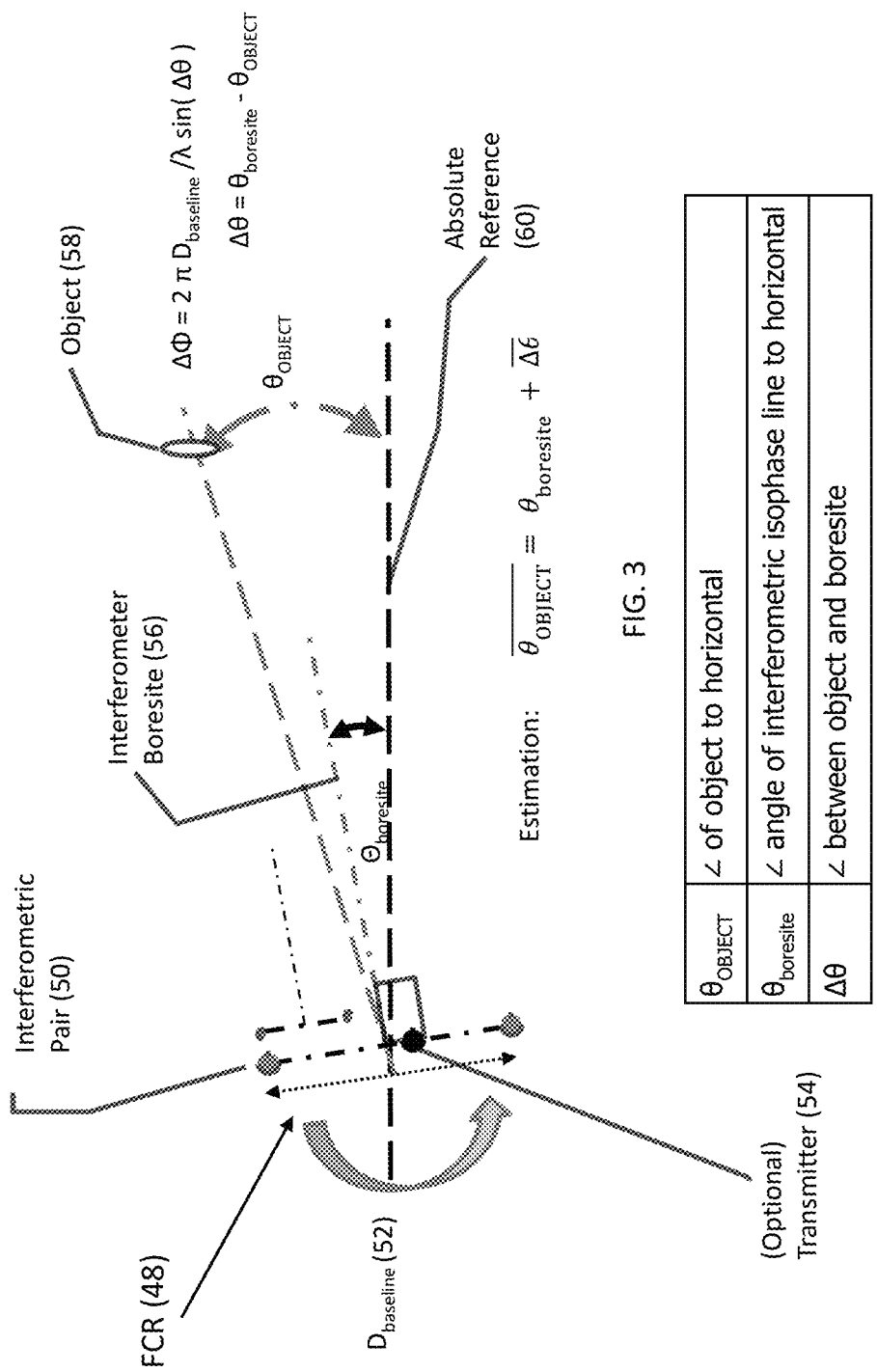
FIG. 3 is a diagram depicting the various quantities involved in an interferometric estimate of an object's (e.g., target or receiver) position.

FIG. 3 depicts the various quantities involved in an interferometric estimate of object (e.g., target or receiver) position. More specifically, the diagram shows an object 58 in the presence of an FCR 48. In some cases, as described herein, the system operates as a conventional interferometric (CI) system, as shown in FIG. 1B, where a single transmitter 54 transmits a signal which is reflected back from an object 58 (i.e., a target) and the signal is detected by two or more receivers or transceivers 50, which are separated by a distance, or baseline 52. In one example, the receivers 50 are shown as a pair of receivers, however multiple receivers or receiver elements in an array are another embodiment. This is referred to as a two-way case. In another embodiment, the system operates as an orthogonal interferometric system such that an FCR illuminates an object 58 (i.e., a receiver). There, as shown in FIG. 1C, the receiver on the object receives signals transmitted by multiple transceivers 50, where transceivers are capable of both transmission and reception. This is referred to as a one-way case.

The phase measurement for either conventional interferometry (CI) or orthogonal interferometry (OI) is as follows:

$$\Delta_\phi = C_\phi \frac{2\pi D}{\lambda} \sin(\theta) \text{ where } C_\phi = 1(CI), 2(OI)$$

$C_\phi$ represents the one or two way geometry and this expression assumes a relatively narrowband signal where the measured differential phase $\Delta\phi$ relates to the differential path $\Delta path = D \sin(\theta)$ developed by the object/receiver angle $\theta$ relative to the interferometers boresite $\theta_{normal}$. While this expression is formally a narrowband relation, interferometric processing based on this expression can be employed over usefully wide bandwidths without noticeable degradation in the achieved precision. This relation between $\Delta_\phi$ and $\theta$ is then inverted to develop an angular estimate:

$$EST(\theta_o) = \operatorname{asin}\left(\frac{\Delta_\phi}{2\pi} * \frac{\lambda}{D_{baseline}}\right)$$

Here, $EST(\theta_o)$ is the estimate of the root angle $\theta_o$ which relates to the true angle $$\theta = \theta_o + \frac{\lambda}{D_{baseline}} * n$$

by an offset involving n ambiguity wraps. Additional processing steps are required to estimate n. This additional processing is known to those of skill in the art and would be included in 27 of FIG. 1A.

According to the principles of the present disclosure, in one of the embodiments the use of orthogonal interferometric processing for guidance and positioning is based on RD map generation over one or more transmissions. After exploiting orthogonality, time, and frequency, etc. each RD map will contain some level of multipath contamination/contribution onto the direct path segment of the respective RD maps. As described herein, aggregated bandwidth is one approach to mitigating these multipath contributions to these respective RD maps. In certain embodiments of the present disclosure, aggregated bandwidth refers to situations where both time and frequency are orthogonal.

Figures 4A, 4B:
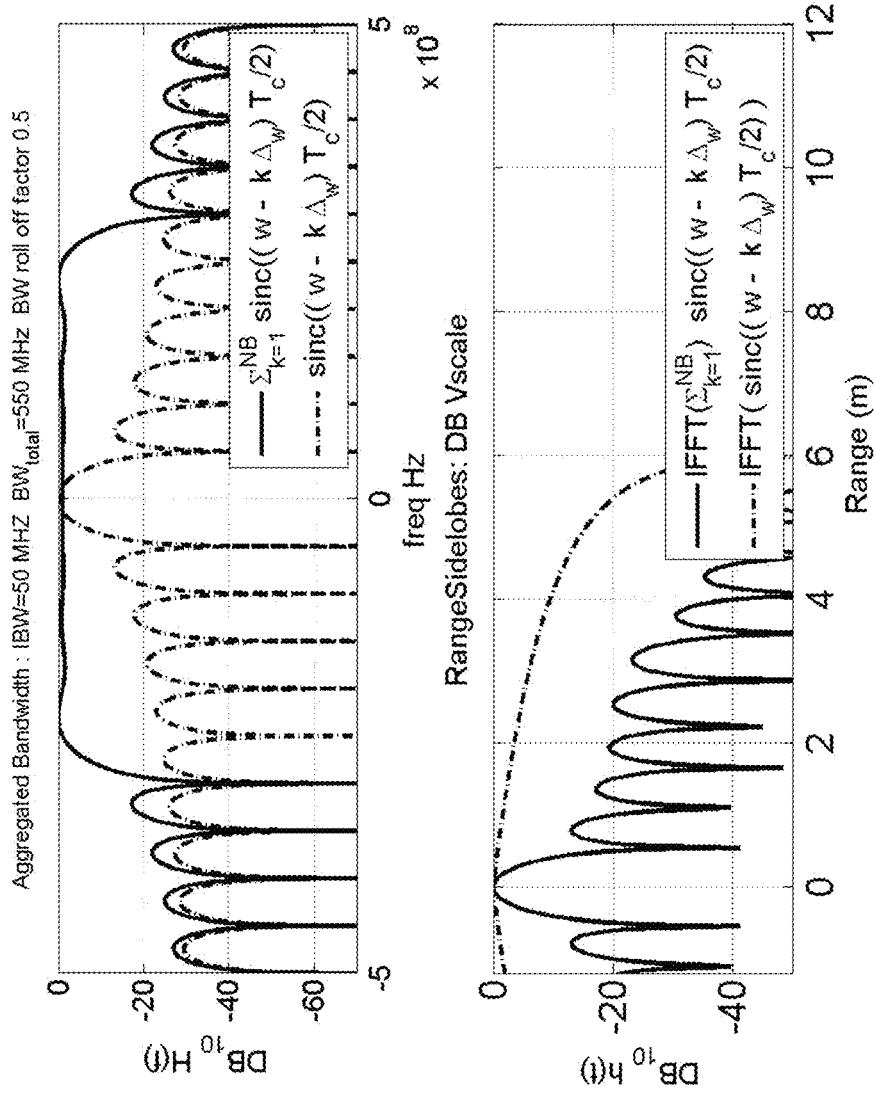
FIG. 4A is a plot of bandwidth stacking across frequency according to one embodiment of the present disclosure.
FIG. 4B is a plot of bandwidth stacking showing range sidelobes according to one embodiment of the present disclosure.

Referring to FIG. 4A and FIG. 4B, the diagrams show certain embodiments of signal processing characteristics of bandwidth stacking according to the principles disclosed herein. More specifically, FIG. 4A is a plot of bandwidth stacking across frequencies according to one embodiment of the present disclosure. Here, the IBW is 50 MHz and $BW_{total}$ of 550 MHz. FIG. 4B is a plot showing improved range sidelobes as a function of increased levels of bandwidth stacking according to one embodiment of the present disclosure.

Referring to FIG. 4C and FIG. 4D, the diagrams show how multipath components affect differential phase precision for interferometric angle estimation according to the principles of the present disclosure. More specifically, in FIG. 4C an RD map with a direct path contribution at "X" and a multipath contribution (a wedge shape with leading point "O") is depicted. In addition, the systems aggregate range resolution (with range sidelobes) 86 is depicted parallel to the "R" axis. Each phase center would have its own RD map which is depicted going "into the page" of the figure at 88.

FIG. 4D depicts the pertinent complex phasors that result from the detection stage of FIG. 1A for a notional simulation of a two RD map example that is used to develop interferometric angular offset estimates. Each of these two complex phasors has a direct component 92, and a multipath component 90 which results in a final total phasor 94. The residual multipath contribution that "bleads through" the range sidelobes biases the total phasor and thus affects the accuracy of the phase measurement. FIG. 4D shows delta phi as 96.

Figure 4E:
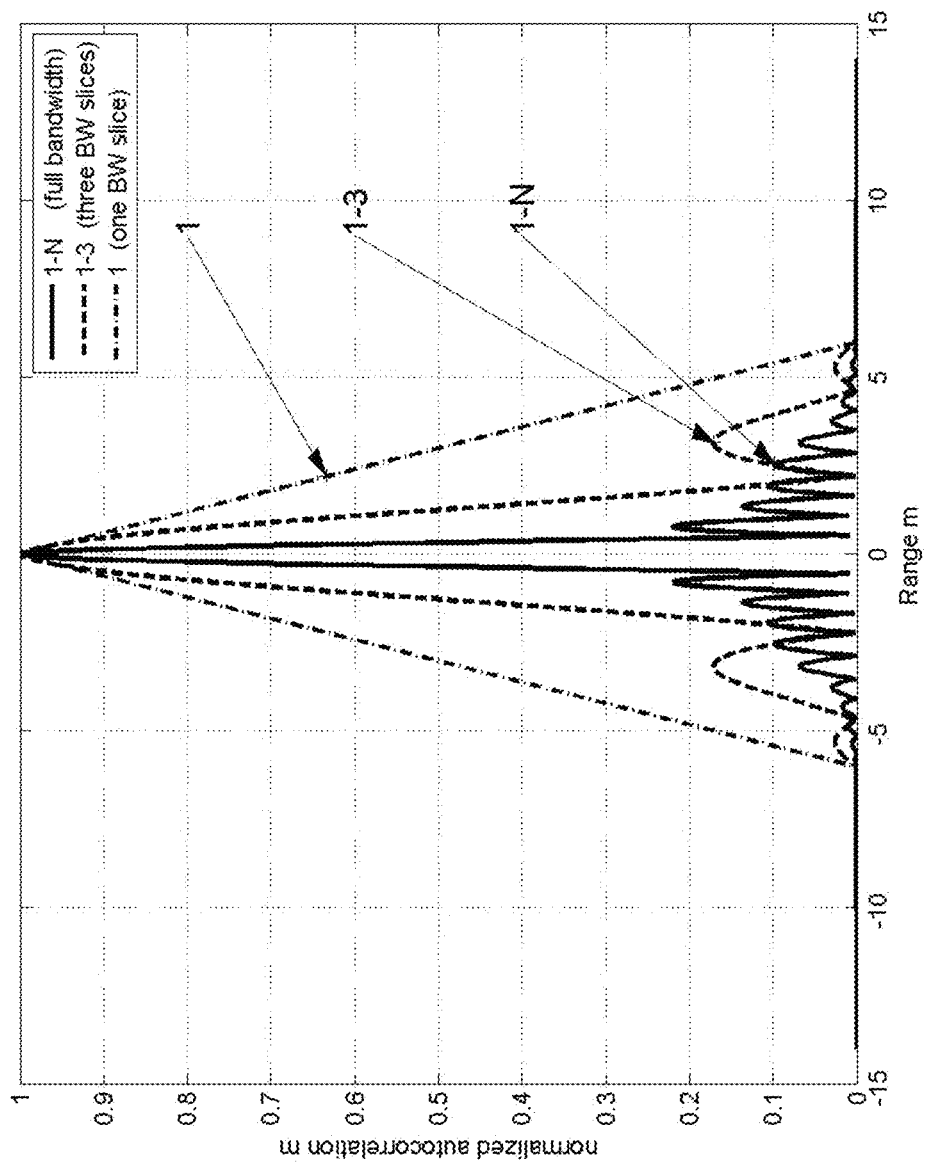
FIG. 4E depicts one embodiment of the representative autocorrelation properties of the presently disclosed processing scheme over a range of bandwidth stacking parameters.

FIG. 4E depicts a simulation of three cases of coherent bandwidth aggregation, namely "1", "1-3" and "1-N" referring to the aggregation of one, three, and N (20 in this case) fundamental bandwidth slices. The points of local maxima past a range offset of 2.5 m are marked on the plot with a "+" sign (at the tips of the arrows for 1, 1-3, and 1-N, respectively); the resulting autocorrelation shows that as the bandwidth is increased the autocorrelation develops increased resolution and additional multipath discrimination capability.

Figure 4F:
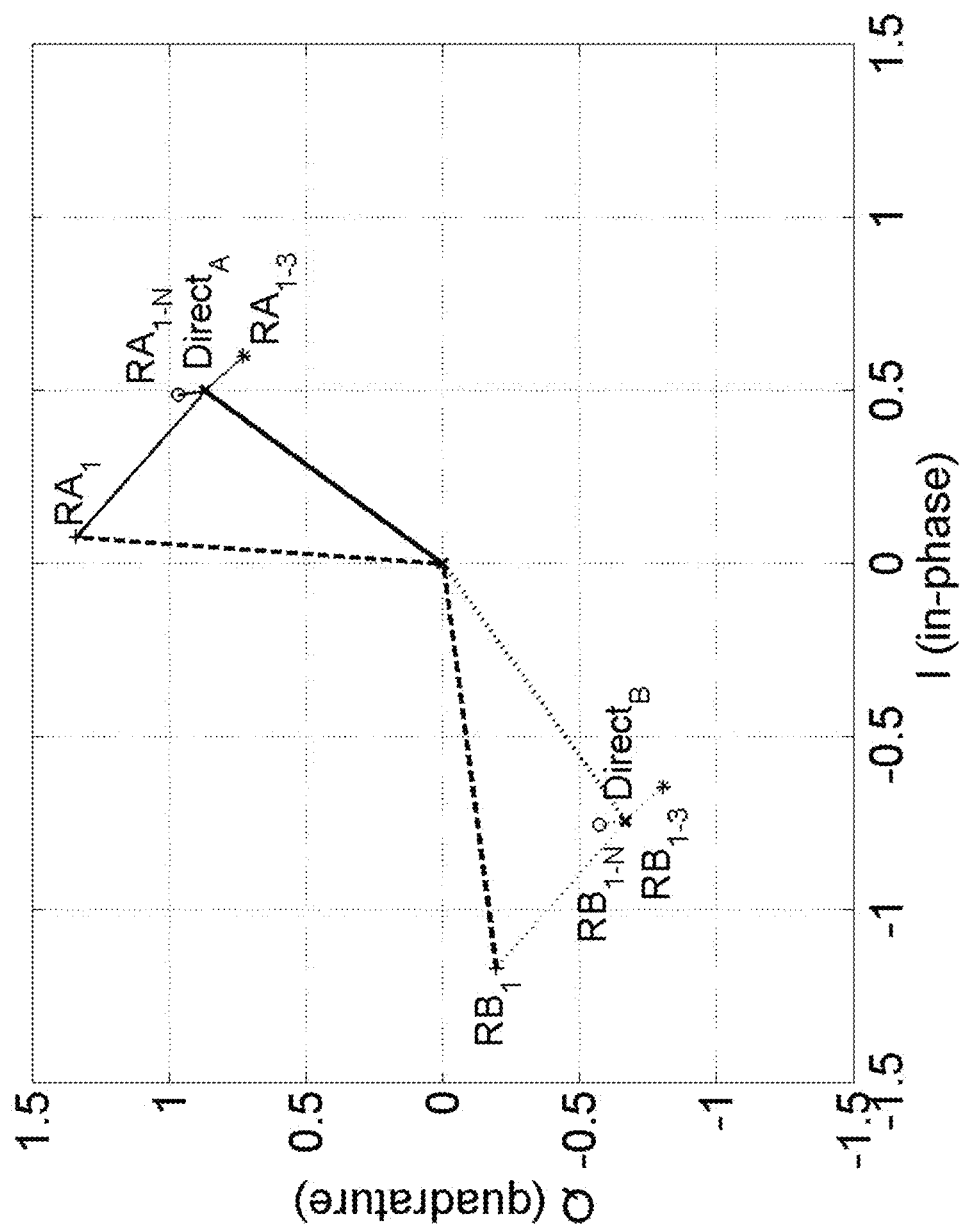
FIG. 4F depicts a phasor diagram representation of the multipath components over the same range of bandwidth stacking parameters as shown in FIG. 4E and the respective differential phase precision for interferometric angle estimation according to the principles of the present disclosure.

FIG. 4F depicts complex phasor quantities at these same "+" points shown in FIG. 4E. In FIG. 4F, the notation A and B are the respective phasor pair. The subscripts 1, 1-3, and 1-N are multipath contributions for the 1, 1-3, and 1-N cases, respectively. R_* is the resulting phasor sum. Only the phasor sum of the $R_1$ case is drawn for the sake of clarity. The bandwidth (BW) aggregation benefit can be observed via the magnitude of the residual multipath components—note they become smaller with more slices (i.e., from 1, to 1-3, to 1-N (of 20 here)). These phasors represent notional complex values of what would be random phase components in an actual system. The impact of the reduced magnitude is best visualized as a circle (i.e., a uniform phase assumption). As depicted, the random phases from the simulation do not depict the worst case bias due to the multipath component, but rather are used for illustrative purposes.

It is understood that Az/El estimation is strongly impacted by interference between direct and (comparable amplitude) ground-reflected signals. In rough ground situations, there could be many ground reflected signals. Bandwidth aggregation, as used herein, achieves sharper range sidelobes and smaller magnitude multipath interference terms resulting in increasingly accurate interferometric angular offset results.

Figure 4G:
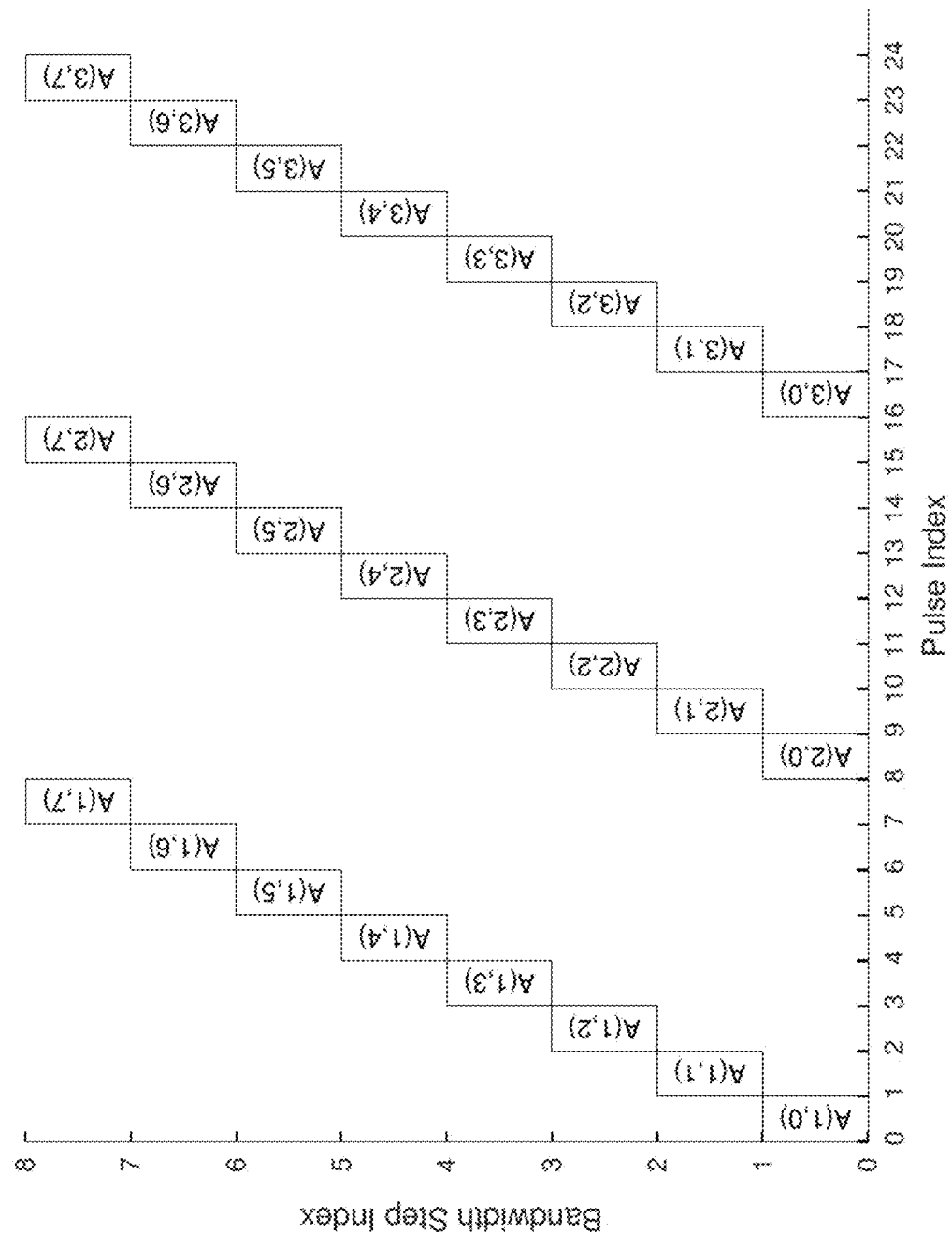
FIG. 4G depicts a time/bandwidth map for a notional orthogonal transmission scheme involving a single code key (A) by one embodiment of the methodology of the present disclosure.

Referring to FIG. 4G, a time/frequency allocation map of a stepped frequency transmission scheme is shown. More specifically, the horizontal axis represents time (pulse index) and the vertical axis represents frequency offset (bandwidth step index). The bandwidth extent of a given pulse is defined as the interval between the first nulls. The spectrum of sinc($2\pi$ freq*T_pulse) yields nulls at frequency=$\pm 1$/T_pulse). The time/bandwidth map for a notional orthogonal transmission scheme involving a single code key (A) is shown. The notation A(i,j) marks $j^{th}$ waveform within the $i^{th}$ CPI of the A code key. The pulse index u is the same as used in the Additional Algorithm Support section.

Figure 4H:
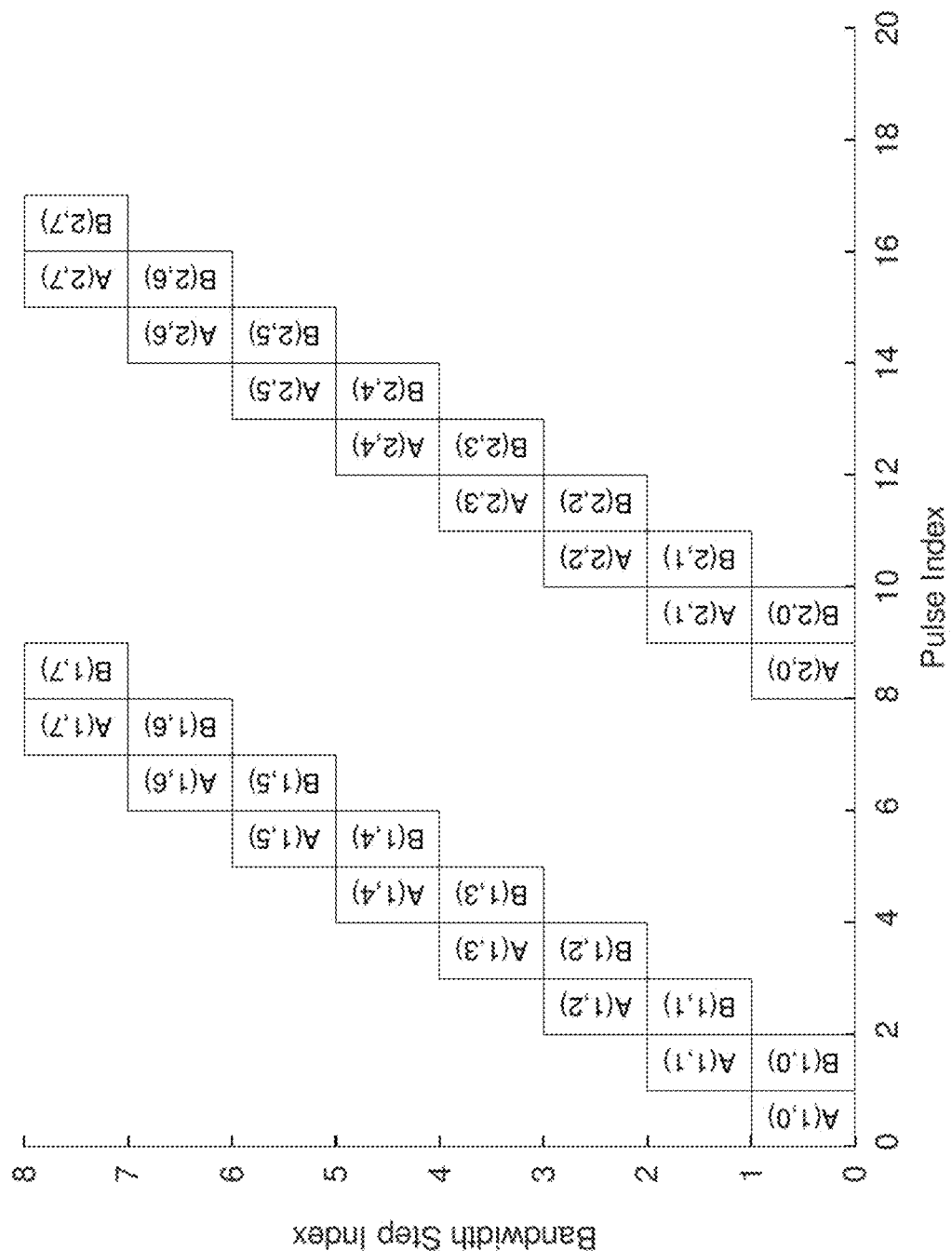
FIG. 4H depicts a time/bandwidth map for a notional orthogonal transmission scheme involving two keys (A and B) by one embodiment of the methodology of the present disclosure.

Referring to FIG. 4H, a time/frequency allocation map for a notional orthogonal transmission scheme involving two keys (A and B) is shown. The notation A,B (i,j) marks $j^{th}$ waveform within the $i^{th}$ CPI of an A and B code key. The pulse index u is the same as used in the Additional Algorithm Support section. As depicted, the scheme would assume frequency orthogonality across respective pairs of A and B waveforms. Other configurations could be employed to reduce time/bandwidth density and achieve disjoint time as well as frequency segments.

One aspect of the approach of the present disclosure is an integrated systems engineering approach that combines: 1) a stepped transmission frequency scheme —traversing two or more instantaneous bandwidths, (e.g., several GHz), while the ADC bandwidth might be a small fraction of the entire frequency sweep, 2) deliberate undersampling of the digitization with a) slight frequency shift keying to convey carrier offset for overpulsed, range ambiguous configurations, b) a scheme to build up the broadband data set over two or more pulses, and c) onboard processing to develop an ultra high range resolution source imagery of the transmission, and 3) methodologies to improve signal processing characteristics as mitigation performance against a particular geometry's multipath bias.

In certain embodiments, frequency-division multiplexing (FDM) is used to divide the total bandwidth available into a series of non-overlapping frequency bands, each of which is used to carry a separate signal. In some cases, time-division multiplexing (TDM) is used to transmit and receive independent signals over a common signal path by means of synchronized switches so that each signal appears only a fraction of time in an alternating pattern. In still other embodiments, orthogonal frequency-division multiplexing (OFDM) is used for digital signal modulation in which a single data stream is split across several separate narrowband channels at different frequencies to reduce interference and crosstalk. In one embodiment, improved signal processing characteristics include 1) variable frequency stepping and PRI jitter and/or 2) adaptive frequency selection to avoid fades or place them at less critical points along the trajectories.

In one embodiment, if each sub-band index is keyed to a particular slow time index pulse index then the broader definition of a matched filter as a RD Map is as follows:

$$(\tau_o,\omega)=\Sigma_u EJ\{\Delta(u)<\tau_o+V_{rad}T_{PRI}u/c>\}\Lambda(u,\tau,\omega)$$

with RD map sub-band term $$\Lambda(u,\tau,\omega_d)=\int_{-\Delta/2}^{\Delta/2} S^*_o(\rho+\Delta(u))R_o(\rho+\Delta(u)+\omega_d)EJ\{(\rho+\omega_d)\tau\}d\rho$$

where each local sub-band (local index u) matched filter has its own frequency dependent phase shift. $V_{rad}$ is the radial velocity of a receiver relative to the transmitter, the velocity induced radial range shift is $\Delta_R(u)=V_{rad}$ u $T_{PRP}$ with commensurate time delay $\Delta_\tau(u)=\Delta_R(u)/c$, and the per pulse phase shift is $\Phi(u)=\Delta_t(u)$ $\omega(u)=\Delta(u)$ $\Delta_\tau(u)$, (and in the linear stepped case of $\Delta(u)=u\Delta$, then $\Phi(u)=\Delta V_{rad}$ $u^2$ $T_{PRI}/c$. (See, e.g., FIG. 4G and FIG. 4H). An Additional Mathematical Support section is presented below to simplify the discussion of the present disclosure. It is to be understood by someone versed in the art that this relative velocity can account for transmitter motion as well as receiver motion.

The slow time index u is represented in the second power because of the stepped frequency index as well as the cumulative radial position of the receiver. If this pulse-wise phase progression term, $EJ\{\Phi(u)\}$, is left uncorrected, the summation over sub-bands $\Sigma_u$ will not cohere. Hence, coherently aggregating the bandwidth in the presence of receiver motion requires the introduction of a pulse index dependent phase term into the per pulse ambiguity function operation:

$$\Lambda_c(\tau_o,\omega)=\Sigma_u EJ\{\Delta(u)\tau_o\}EJ\{-\Phi(u)\}\Lambda(u,\tau,\omega)$$

which coherently aggregates the bandwidth for the moving receiver case.

The pulse-wise phase correction operation represented by $EJ\{-\Phi(u)\}$ is similar to Synthetic Aperture (SA) processing, except that the algorithm definition allows for a sub-band narrow enough to allow for a single phase term $\Phi(u)$ to be applied within the entire $\Delta$ bandwidth at pulse u.

It will be understood by practitioners versed in the art of radar processing that an estimation loop can be closed around assumed known parameters such as $V_{rad}$, and/or nominal range to provide a running estimate of this parameter to support the mathematical operations described in the Additional Mathematical Support Section.

In one embodiment of the system for extended bandwidth tracking for dynamic environments of the present disclosure in a single aperture RD map process example, radio frequency (RF) radiation impinges onto an aperture and induces voltages that are then digitized by an ADC. The resulting numeric voltages reside in computer memory and serve as the input, intermediate products, and the output values for all ensuing method steps.

Additional Algorithm Support:

The classical matched filter definition over the 2D parameter space $(\tau, \omega_d)$ can be expressed as a parameterized dot product of the signal template $s_o(t-\tau) \, EJ\{f_d \, t\}$ against the received signal $r(t)$ as (notation: $EJ(x) \equiv e^{jx}$)

$$
\begin{aligned}
\Lambda(\tau, \omega_d) &= \int_{To}^{Tf} s_o^*(t-\tau) \, EJ\{-\omega_d (t-\tau)\} \, r(t) \, dt \\
&= \int_{To}^{Tf} \int_{\vee} S_o^*(\vee) \, EJ\{-\vee (t-\tau)\} \, d\vee \, EJ\,\backslash\{-\omega_d (t-\tau)\} \int_\omega R(\omega) \\
&\quad EJ\{\omega \, t\} \, d\omega \, dt \\
&= \int_\omega \int_\vee S_o^*(\vee) \, R(\omega) \, d\vee \, EJ\,\{(\vee + \omega_d) \tau\} \int_{To}^{Tf} EJ\{-t \, (\vee + \omega_d - \omega)\} \, dt \\
&= \int_\omega \int_\vee S_o^*(\vee) \, R(\omega) \, d\vee \, EJ\,\{(\vee + \omega_d) \tau\} \, \mathrm{sinc}\,((\vee + \omega_d - \omega)(T_f-T_o)) \Rightarrow \delta(\vee + \omega_d - \omega) \text{ as } (T_f-T_o) \text{ grows large} \\
&= \int_\vee S_o^*(\vee) \, EJ\{(\vee + \omega_d) \tau\} \int_\omega R\,\}(\omega) \, \delta(\vee + \omega_d - \omega) \, d\vee \, d\omega \\
&= \int_\vee S_o^*(\vee) \, R(\vee + \omega_d) \, EJ\{(v + \omega_d) \tau\} \, d\vee
\end{aligned}
$$

This frequency domain casting of the 2D matched filter is a more natural basis for the bandwidth stacking method described herein. Now, we extend this standard RD map definition generation to include a moving receiver with slow time pulse index "u" processing and stepped frequency transmission. Assuming each slow time index has a pulse dependent frequency shift, then the general RD map steps above are revised to include explicit terms for Doppler and slow time processing per:

The matched filter over the 2D parameter space $(\tau, \omega_d)$ which can be expressed as $$\Lambda(\tau,\omega_d) = \int S_o^*(\vee) R(\vee+\omega_d) EJ\{(\vee+\omega_d)\tau\} d\vee$$

where the difference between the actual transmission frequency $(\omega_a)$ and the received frequency $(\omega)$ is the Doppler frequency $\omega_d = \omega - \omega_a$. The frequency shift is due to radial velocity $V_{rad}$ and wavelength $\lambda(\omega) = \omega/c$ resulting in $\omega_d = 2\pi V_{rad}/\lambda(\omega)$ Defining a bandwidth step $\Delta$, a pulse index u the relation between a local frequency variable $\rho$ and large frequency $\vee$, $\vee = \rho + \Delta(u)$ and a delay that depends on pulse index u, $\tau(u)$, the wideband frequency interval $\int d\vee$ can be factored into $N_u$ sub-bands $$
\begin{aligned}
\Lambda(\tau, \omega_d) &= \Sigma_u \int_{-\Delta/2}^{\Delta/2} S^*_o(\rho + \Delta(u)) R(\rho + EJ\{(\rho + \Delta(u) + \omega_d)\tau\} d\rho \\
&\quad \Delta(u) + \omega_d) \\
&= \Sigma_u \, EJ\{\Delta(u)\tau(u)\} \quad \int_{-\Delta/2}^{\Delta/2} S^*_o(\rho + \Delta(u)) R_o(\rho + \Delta(u) + \omega_d) EJ\{(\rho + \omega_d)\tau\} d\rho \\
&= \Sigma_u \, EJ\{\Delta(u)\tau(u)\} \quad \int_{-\Delta/2}^{\Delta/2} S^*_{oo}(\rho;u) R_{oo}(\rho + \omega_d;u) EJ\{(\rho + \omega_d)\tau\} d\rho \\
&= \Sigma_u \, EJ\{\Delta(u)\tau(u)\} \, \Lambda(u, \tau, \omega_d)
\end{aligned}
$$

where $S_{oo}(\rho;u) = S_o(\rho+\Delta(u))$ and $R_{oo}(\rho;u) = R_{oo}(\rho+\Delta(u))$ are local functions centered at $\omega = \Delta(u)$. We can now define a bandlimited likelihood function centered at the local stepwise center frequency $\Delta(u)$ as shown, below:

$$\Lambda(u,\tau,\omega_d) = \int_{-\Delta/2}^{\Delta/2} S^*_{oo}(\rho;u) R_{oo}(\rho+\omega_d;u) EJ\{(\rho+\omega_d)\tau\} d\rho$$

As a function of slow time (u), the moving receiver delay can be defined as $\tau(u) \sim \tau_o + V_{rad} T_{PRI} u/c$, where $\tau_o = R_o/c$ is the nominal delay at the start of the observation CPI, $T_{PRI}$ is the pulse interval, and c is the speed of light. The aggregate bandwidth likelihood function can then be recast as a function of a nominal delay $\tau_o$, radial velocity $V_{rad}$, and pulse repetition interval:

$$
\begin{aligned}
\Lambda(\tau_o, \omega_d) &= \Sigma_u \quad EJ\{\Delta(u)\tau(u)\} \Lambda(u, \tau_o, \omega_d) \\
\Lambda(\tau_o, \omega_d; V_{rad}, T_{PRI} v) &= \Sigma_u \quad EJ\{\Delta(u)\langle\tau_o + V_{rad} T_{PRI} u/c\rangle\} \\
&\qquad \Lambda(u, \tau_o, \omega_d)
\end{aligned}
$$

where the pulse dependent delay is $\tau(u) = \tau_o + \Delta_\tau(u) = \tau_o + V_{rad} T_{PRI} u/c$ and the pulse dependent frequency is $\omega(u)$. In the case of a linear stepped frequency $\omega(u) = u \Delta$.

The resulting per pulse phase shift is the product of the cumulative frequency shift and delay $\Phi(u) = \Delta_\tau(u) \, \omega(u) = \Delta_\tau(u) \Delta(u)$. In the case of a linear stepped frequency, $\Delta(u) = u\Delta$, then $\Phi(u) = \Delta V_{rad} u^2 T_{PRI}/c$ and contains the expected $u^2$ term due to the stepped frequency effect as well as the cumulative radial position of the receiver. Accounting for this pulse-wise phase progression term $EJ\{\Phi(u)\}$ is a requirement to maintain coherency across the span of slow time measurements ($u \subset 1 \ldots N_u$) being aggregated.

In order to coherently aggregate the signal bandwidth in the presence of receiver motion we introduce a pulse-wise correction (to remove the $EJ\{\Phi(u)\}$ term) into the per pulse ambiguity function prior to summation over u, the phase correction term is applied according to:

$$\Lambda_{u,c}(\tau_o, \omega_d) = \Lambda(u, \tau, \omega_d) * EJ\{-\Phi(u)\}$$

Then the resulting pulse-wise motion corrected RD map, is the following. This coherently aggregates the overall bandwidth equivalent for the moving receiver case.

$$
\begin{aligned}
\Lambda(\tau_o, \omega_d; V_{rad}, T_{PRI}) &= \Sigma_u \Lambda_{u,c}(\tau_o, \omega_d) \\
&= \Sigma_u EJ\{\Delta(u)\tau_o\} \Lambda(u, \tau_o, \omega_d)
\end{aligned}
$$

Flowcharts according to the principles of the present disclosure are as follows.

| Single aperture RD map process ||||
|---|---|---|---|
| INTERMEDIATE QUANTITY | PROCESS | RESULT | DESCRIPTION |
| RF | ⇒digitize | $r_{stream}(t_a)$ | demodulate and digitized the RF voltage into a stream format $t_a$ is absolute time |
| $r_s(t_a)$ | ⇒reformat | $r(t, u)$ | based on factoring the absolute time by $t_a = t + u*PRI$ |
| $r(t,u)$ | ⇒FT[t⇒ω] | $R(\omega,u)$ | take Fourier transform on the fast time dimension of the received signal |
| $R(\omega,u)$ | ⇒reformat bandlimit per $u\Delta$ | $R(\rho + \omega_d + u\Delta)$ | form the bandlimited spectra center at $\omega - u\Delta$. For notational simplicity, $R(\ ) \to R(,)$ |
| $S_o(\omega,u)$ | ⇒reformat & | $So(\rho + \omega_d + u\Delta)$ | similarly, define the bandlimited spectra center for the transmission template-library |
| for each $R(\rho + \omega_d; u)$ sub-band received signal | slow time index u sub-band matched filter | calculate $\Lambda_u(\tau_o, \omega_d)$ | $\int_{-\Delta/2}^{\Delta/2} S^*_o(\rho; u) R(\rho + \omega_d; u) EJ\{(\rho + \omega_d)\tau\}d\rho$ |
| $\Phi_u$ | calculation | | $= \Delta_\tau(u)\omega_u = \Delta_\tau(u)u\Delta = \Delta V_{rad} u^2 T_{PRI}/c$ |
| $\Lambda_{u,c}(\tau_o, \omega_d)$ | calculation queue filling | $\Lambda_u(\tau_o, \omega_d)*EJ\{-\Phi_u\}$ $u \subset [u0, uN]$ | on each interval where an RD map image will be formed, $u \subset [u_o, u_o + N_u]$ |
| $\Sigma_{uo}^{uN}\Lambda_{u,c}(\tau_o, \omega_d)$ | calculation ⇒ | $\Lambda(\tau_o, \omega_d); V_{rad}, T_{PRI})$ | aggregated bandwidth matched filter ⇒ RD map |

| Multiple Aperture Interferometry ||||
|---|---|---|---|
| INTERMEDIATE QUANTITY | PROCESS | RESULT | DESCRIPTION |
| $\Lambda(\tau_o, \omega_d);$ $V_{rad}, T_{PRI}$ | loop over all $a \subset N_a$ | $\Lambda_a(\tau_o, \omega_d); V_{rad}, T_{PRI}$ | $(\ )_a$ subscript denotes the RD map associated with the $a^{th}$ aperture |
| $\Lambda_a(\tau_o, \omega_d);$ $V_{rad}, T_{PRI}$ | Detection | ordered sets Range/Doppler values $(\tau_o^D, \omega_d^D)_a$ where $\Lambda_a(\tau_o^D, \omega_d^D); V_{rad}, T_{PRI}$ | satisfies detection statistics |
| | Co-registration | for each $b \subset N_b$ interferometric baselines comprised of a set of ordered pairs $[\alpha, \beta]$ of RD map detections, where $\alpha, \beta \subset N_a$ apertures, and $N_b = N_a!/((N_a - 2)!\ 2)$ aperture pair permutations | ensure that $(\tau_o^D, \omega_d^D)_\alpha$ and $(\tau_o^D, \omega_d^D)_\beta$ agree |
| $(\tau_o^D, \omega_d^D)_\alpha,$ $(\tau_o^D, \omega_d^D)_\beta,$ | Interferometry ⇒ | $\Gamma_b(\tau_o^D, \omega_d^D); V_{rad}, T_{PRI}) \equiv$ $\Lambda_\alpha(\tau_o^D, \omega_d^D); V_{rad}, T_{PRI})\Lambda_\beta^*$ $(\tau_o^D, \omega_d^D); V_{rad}, T_{PRI}$ | |
| $\Gamma_b(\tau_o^D, \omega_d^D); V_{rad}, T_{PRI}$ | phase estimation ⇒ | $\Delta\Phi_b = \angle$ $\Gamma_b(\tau_o^D, \omega_d^D); V_{rad}, T_{PRI}$ | |
| $\Delta\Phi_b$ | angle estimation ⇒ Angle Disambiguation | $EST(\theta_{o,b}) = asin(\Delta\Phi_b * D_{baseline,b}/2\pi)$ | root angle for each baseline |
| $EST(\theta_{o,b})$ | ⇒ | $EST(\theta) = (\theta_{o,b}) + n\lambda/D_{baseline,b}$ | ambiguity processing |
| $EST(\theta)$ | Display & Track ⇒ | Report out the object's position at $[\theta, \tau_o^D, \omega_d^D]$ | |

The computer readable medium as described herein can be a data storage device, or unit such as a magnetic disk, magneto-optical disk, an optical disk, or a flash drive. Further, it will be appreciated that the term "memory" herein is intended to include various types of suitable data storage media, whether permanent or temporary, such as transitory electronic memories, non-transitory computer-readable medium and/or computer-writable medium.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A method for precision guidance and positioning or tracking of an object, comprising:
    transmitting, from one or more spatially displaced antenna elements, a sequence of transmitted pulses with a center frequency that varies per pulse;
    receiving the sequence of transmitted pulses at one or more receiving antenna elements;
    processing over a plurality of received signals, comprising:
    forming a complex valued range/Doppler map developed by correlating a received signal with a transmitted signal by matched filtering against a respective transmit key;
    coherently summing the sequence of center frequency varied pulses over the plurality of received pulses;
    applying a correction term representing a conjugate of a phase shift due to a frequency shift and a radial motion phase shift effect, thus achieving an increased effective bandwidth; and
    performing radar post processing and interferometric post processing to produce precision guidance and positioning or tracking data for an object, the data having an increased effective range resolution with reduced vulnerability to multipath bias effects.

2. The method according to claim 1, wherein the object is a passive target or an object comprising an RF receiver.

3. The method according to claim 1, wherein radar post processing comprises:
    performing pulse compression and decoding;
    forming a range/Doppler map for each phase center;
    identifying one or more detections in each range/Doppler map, wherein the detections are associated with a particular transmit/receive pair;
    removing ambiguities in range and Doppler in each range/Doppler map; and
    co-registering one or more detections across a plurality of range/Doppler maps.

4. The method according to claim 1, wherein interferometric post processing comprises:
    performing phase comparisons for each co-registered detection; and
    performing angle estimation of the position of the one or more objects.

5. The method according to claim 1, wherein matched filtering comprises two or more spatially disjoint receptions matched filtered against a single transmission.

6. The method according to claim 1, wherein matched filtering comprises a spatially coincident reception that is decomposed into two or more distinct signals by matched filtering against two or more distinct transmissions.

7. The method according to claim 1, wherein transmitting comprises a bandwidth step index that is proportional to a pulse index.

8. A method for precision guidance and positioning or tracking of an object, comprising:
    receiving a sequence of one or more transmitted pulses at one or more receiving antenna elements;

processing over a plurality of received signals, comprising:

forming a complex valued range/Doppler map developed by correlating a received signal with a transmitted signal by matched filtering against a respective transmit key;

coherently summing a sequence of center frequency varied pulses over the plurality of received pulses;

applying a correction term representing a conjugate of a phase shift due to a frequency shift and a radial motion phase shift effect, thus achieving an increased effective bandwidth; and performing radar post processing and interferometric post processing to produce precision guidance and positioning or tracking data for an object, the data having an increased effective range resolution with reduced vulnerability to multipath bias effects.

9. The method according to claim 8, wherein the object is a passive target or an object comprising an RF receiver.

10. The method according to claim 8, wherein the one or more transmitted pulses comprise a bandwidth step index that is proportional to a pulse index.

11. The method according to claim 8, wherein radar post processing comprises:

performing pulse compression and decoding;

forming a range/Doppler map for each phase center;

identifying one or more detections in each range/Doppler map, wherein the detections are associated with a particular transmit/receive pair;

removing ambiguities in range and Doppler in each range/Doppler map; and co-registering one or more detections across a plurality of range/Doppler maps.

12. The method according to claim 8, wherein interferometric post processing comprises:

performing phase comparisons for each co-registered detection; and performing angle estimation of the position of the one or more objects.

13. The method according to claim 8, wherein matched filtering comprises two or more spatially disjoint receptions matched filtered against a single transmission.

14. The method according to claim 8, wherein matched filtering comprises a spatially coincident reception that is decomposed into two or more distinct signals by matched filtering against two or more distinct transmissions.

15. A computer program product including one or more machine-readable non-transitory mediums encoded with instructions that when executed by one or more processors cause a process to be carried out for guidance, positioning, or tracking of an object, the process comprising:

forming a complex valued range/Doppler map developed by correlating a received signal with a transmitted signal by matched filtering against a respective transmit key;

coherently summing a sequence of center frequency varied pulses over a plurality of received pulses;

applying a correction term representing a conjugate of a phase shift due to a frequency shift and a radial motion phase shift effect, thus achieving an increased effective bandwidth; and performing radar post processing and interferometric post processing to produce precision guidance and positioning or tracking data for an object, the data having an increased effective range resolution with reduced vulnerability to multipath bias effects.

16. The computer program product according to claim 15, wherein the object is a passive target or an object comprising an RF receiver.

17. The computer program product according to claim 15, wherein radar post processing comprises:

performing pulse compression and decoding;

forming a range/Doppler map for each phase center;

identifying one or more detections in each range/Doppler map, wherein the detections are associated with a particular transmit/receive pair;

removing ambiguities in range and Doppler in each range/Doppler map; and co-registering one or more detections across a plurality of range/Doppler maps.

18. The computer program product according to claim 15, wherein interferometric post processing comprises:

performing phase comparisons for each co-registered detection; and performing angle estimation of the position of the one or more objects.

19. The computer program product according to claim 15, wherein matched filtering comprises two or more spatially disjoint receptions matched filtered against a single transmission.

20. The computer program product according to claim 15, wherein matched filtering comprises a spatially coincident reception that is decomposed into two or more distinct signals by matched filtering against two or more distinct transmissions.

* * * * *